April 12, 1949.　　　C. E. DELLENBARGER　　　2,466,934
EXTRUDING MACHINE FOR PLASTIC MATERIAL
Filed Jan. 5, 1946　　　　　　　　　　　　　4 Sheets-Sheet 1

INVENTOR:
Charles E. Dellenbarger
BY
ATTORNEY

April 12, 1949.  C. E. DELLENBARGER  2,466,934
EXTRUDING MACHINE FOR PLASTIC MATERIAL
Filed Jan. 5, 1946  4 Sheets-Sheet 2

Inventor:
Charles E. Dellenbarger
Attorney

April 12, 1949. C. E. DELLENBARGER 2,466,934
EXTRUDING MACHINE FOR PLASTIC MATERIAL
Filed Jan. 5, 1946 4 Sheets-Sheet 3
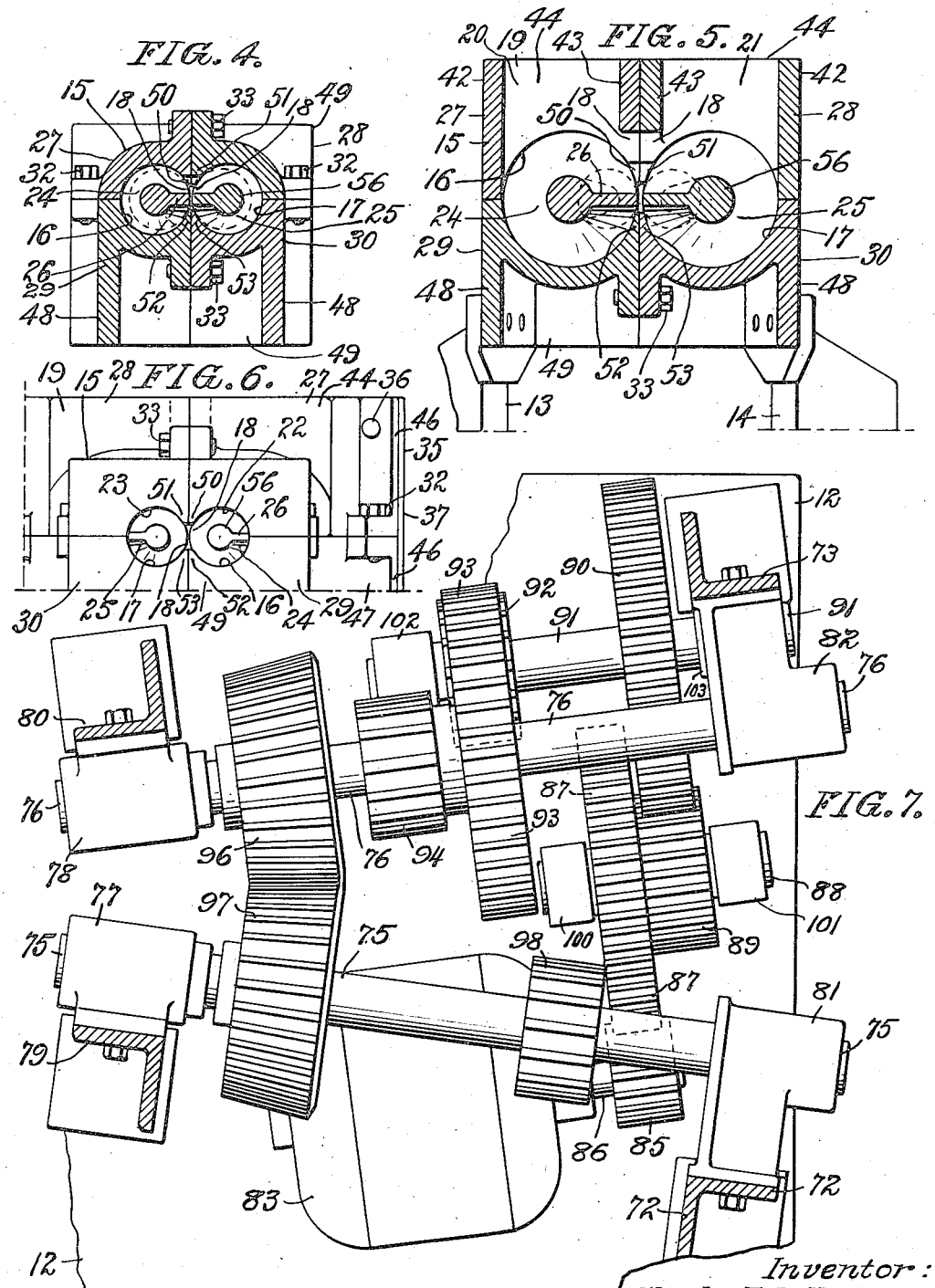

April 12, 1949.  C. E. DELLENBARGER  2,466,934
EXTRUDING MACHINE FOR PLASTIC MATERIAL
Filed Jan. 5, 1946  4 Sheets-Sheet 4
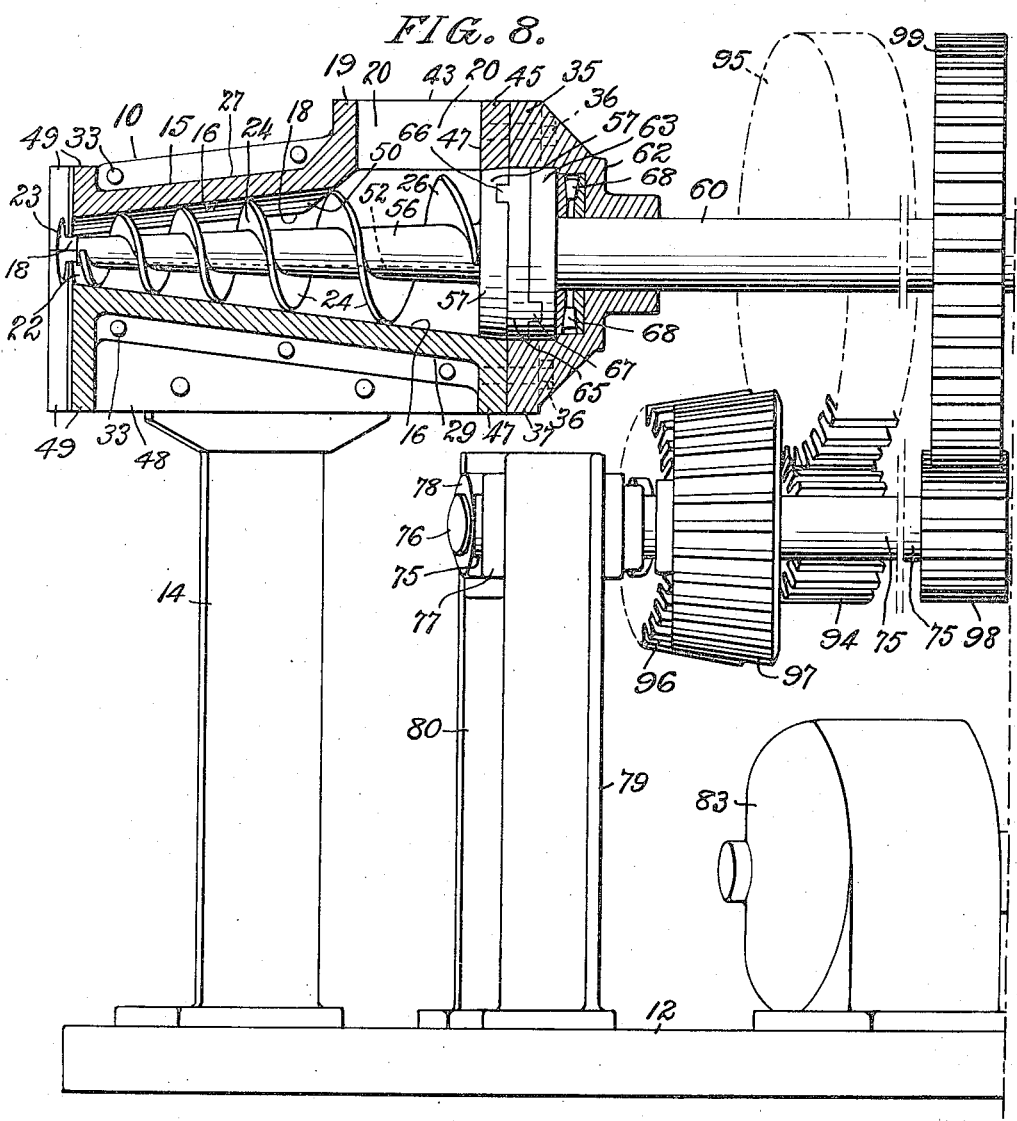
Inventor:
Charles E. Dellenbarger
Attorney Patented Apr. 12, 1949

2,466,934

UNITED STATES PATENT OFFICE 2,466,934

EXTRUDING MACHINE FOR PLASTIC MATERIAL

Charles E. Dellenbarger, Chicago, Ill.

Application January 5, 1946, Serial No. 639,171

2 Claims. (Cl. 18—12)

1

My invention relates to improvements in extruding machines for extruding plastic material.

The object of my invention is to construct a machine for continuously extruding the material and employing screw impellers arranged in a novel manner, whereby greater power may be applied to the impellers than has been possible heretofore.

A further object is to provide a housing having conical chambers for receiving the material to be extruded, and employ conical screw impellers within said chambers, arranged with the conical surfaces of the chambers and impellers tapering toward the restricted discharge orifice located at the smaller ends of said chambers, whereby the conical impellers will act upon the material with increasing pressure as it is moved through said chambers, and the material will be discharged through said orifice at a high velocity by the action of the conical impellers.

A further object is to employ two conical screw impellers arranged with their axes forming an acute angle and having a common vertex, and the lateral conical surfaces of said impellers positioned tangent to each other, whereby the blades of the adjacent impellers will act together upon the material with a gradually increasing impelling force as the material is acted upon by the reduced area of the blades of the impellers adjacent to the apexes of the latter.

A further object is to provide a novel housing having said conical chambers for confining the plastic material about the impellers, and also provide the housing with a longitudinal passage extending laterally between said chambers, through which passage the material may be mixed together and subjected to the combined action of the impellers.

A further object is to provide shafts for rotating the impellers, and arrange the shafts in axial alignment with the respective impellers, whereby said shafts may be extended in angular relation to each other, and also extended beyond the housing a sufficient distance to permit large gear wheels to be mounted upon the shafts for applying extremely high powered driving means for rotating the shafts and the impellers.

A further object is to provide a novel arrangement of countershafts positioned in parallel relation to the shafts which rotate the impellers. Speed reduction gears are provided between each pair of parallel shafts.

A further object is to mount bevel gears upon the converging ends of the countershafts, for rotating the latter in unison, by applying power to one of the countershafts.

2

These together with various other novel features of construction and arrangement of the parts, which will be hereinafter more fully described and claimed, constitute my invention.

Referring to the accompanying drawings:

Fig. 2 is a longitudinal, vertical, section on line 3—3, Fig. 1.

Fig. 4 is a transverse, vertical, section on line 4—4, Fig. 1.

Fig. 5 is a transverse, vertical, section on line 5—5, Fig. 1.

Fig. 6 is an end elevation of a portion of the housing looking toward the left hand end of Fig. 1.

Fig. 7 is a horizontal section on line 7—7, Fig. 2.

Fig. 8 is a longitudinal, vertical, section on line 8—8, Fig. 1.

Figure 1:
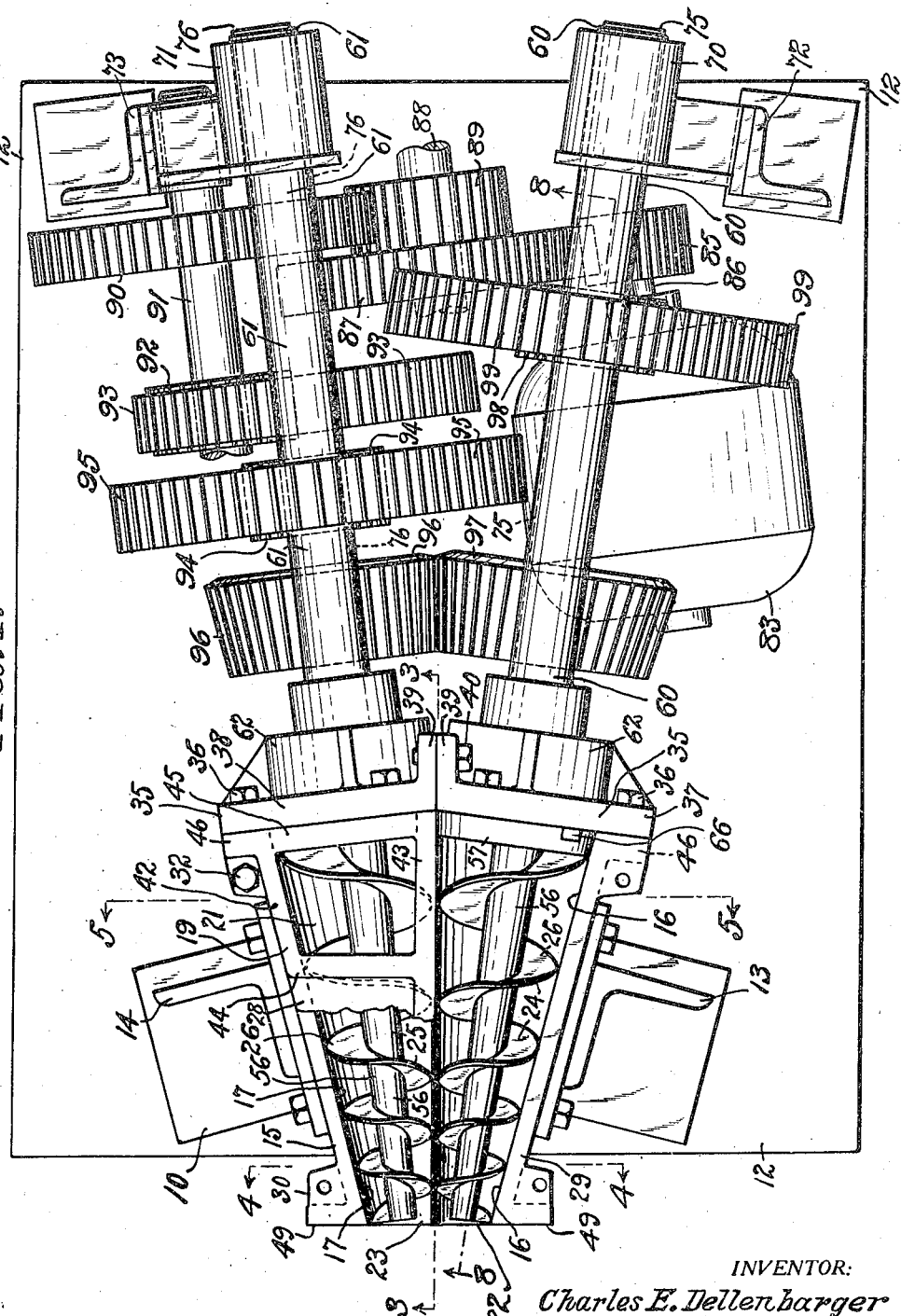
Fig. 1 is a plan view of my novel extruding machine, with a portion of the housing broken away for showing the impellers.

In the drawings in which like reference characters refer to like parts, 10 represents my novel extruding machine, having a bed plate 12 upon which is mounted pedestals 13 and 14, supporting a housing 15.

The housing 15 has conical chambers 16 and 17 formed therein for receiving plastic material which is to be subjected to pressure and extruded from said chambers. Said housing is provided with a longitudinal passage 18, which extends the entire length of said chambers and provides a lateral passage for the plastic material between the chambers 16 and 17. The housing 15 has a hopper 19, provided with inlet openings 20 and 21, communicating with the larger ends of the chambers 16 and 17. Said housing has discharge openings 22 and 23, forming a common orifice located at the smaller ends of said chambers.

Truncated conical screw impellers 24 and 25, formed with helical blades 26, are mounted for rotation within the chambers 16 and 17, for compressing the plastic material and extruding the latter from said chambers. The conical chambers 16 and 17 are coextensive with the generated conical surfaces of the impellers 24 and 25, and their axes coincide, therefore the following description of the impellers will also apply to said chambers 16 and 17.

The axes of the conical impellers 24 and 25 are positioned in a horizontal plane, as shown in Figs. 4 to 6. If the axes of the impellers, as shown in Fig. 1, were extended beyond the upper bases of their conical frustrums, said axes would converge at a common vertex just beyond the housing 15, adjacent to the discharge openings 22 and 23. The axes of the impellers diverge from said common vertex at an acute angle and the larger bases of the conical impellers are located adjacent to the inlet openings 20 and 21 of the housing.

The lateral generated conical surfaces of the blades 26 of the two impellers are tangent to each other and the adjacent elements of the cones extend in parallel relation throughout the length of the conical chambers 16 and 17 along a line bisecting the angle formed between the axes of the impellers. The impellers are mounted within the housing so that the blades 26 will have a working clearance between them.

The medial portion of the housing 15, between the chambers 16 and 17, provided with the above mentioned longitudinal passage 18, which permits the impellers 24 and 25 to be positioned so that the blades 26 will roll together in tangential relation and extrude the plastic material from the chambers 16 and 17.

The housing 15 is made in four sections 27 to 30, each section having walls forming horizontal facing surfaces which are secured together by bolts 32, and vertical facing surfaces which are secured together by bolts 33, as shown in Figs. 3 to 6.

Figure 2:
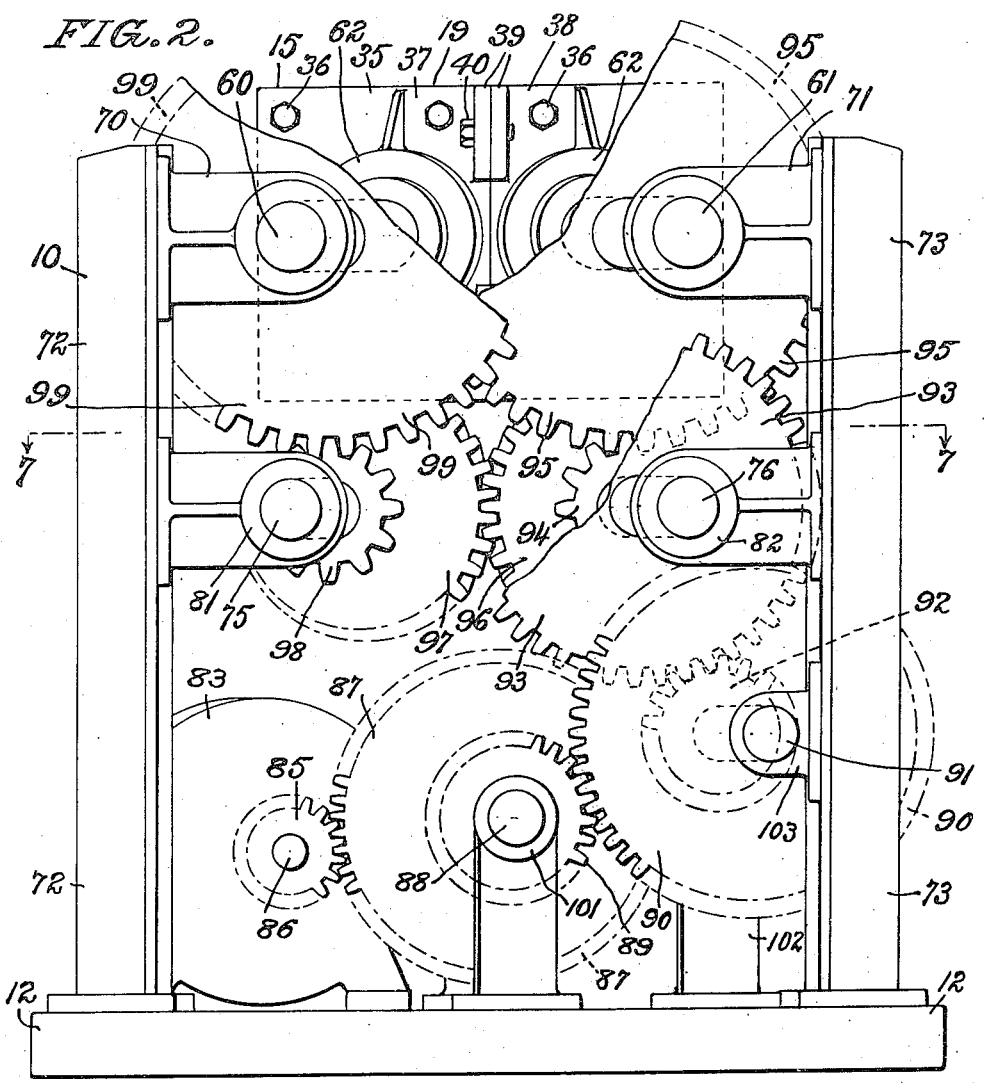
Fig. 2 is an end elevation looking toward the right hand of Fig. 1.
Figure 3:
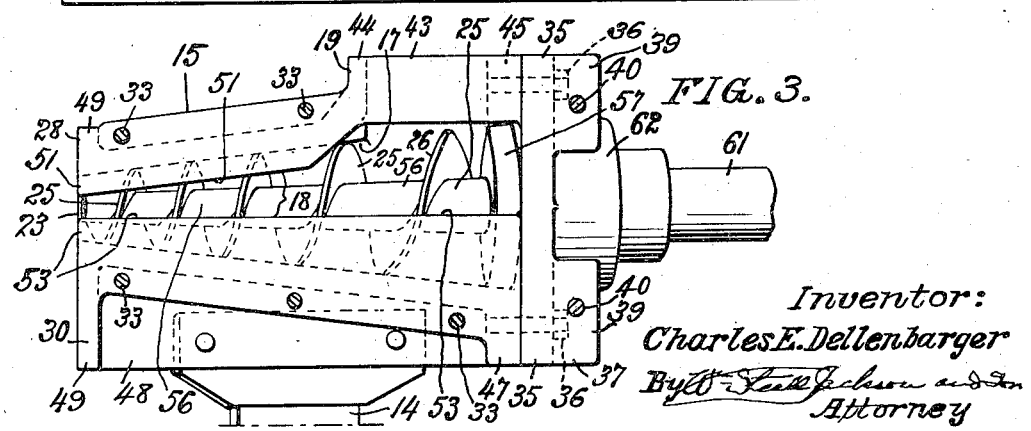

The housing sections 27 to 30 are secured to an end bearing head 35 by bolts 36. The head 35 comprises two sections 37 and 38, having lugs 39 provided with vertical facing surfaces, secured together by bolts 40, as shown in Figs. 2 and 3. By this construction the impellers 24 and 25 may be readily inserted and removed from the housing 15 by removing the two upper sections 27 and 28 from the end head sections 37 and 38 and from the two lower sections 29 and 30. The latter sections 29 and 30 are mounted upon the pedestals 13 and 14.

The upper sections 27 and 28 of the housing have upstanding walls which form the hopper 19. As shown in Figs. 1, 3 and 5, each of the upper sections 27 and 28 has upstanding longitudinal walls 42 and 43, and transverse walls 44 and 45, which form one half of the hopper 19. The wall 43 is for strengthening the housing only, as it is not essential that the hopper 19 have separate inlet openings. Said sections 27 to 30 have laterally projecting flanges 46, as shown in Fig. 1, which are located in the same vertical planes with the walls 45 of the hopper 19. The flanges 46 are secured to the end head 35 by said bolts 36. The lower sections 29 and 30 have depending flanges 47 also secured to the head 35, as shown in Fig. 3. The lower sections 29 and 30 have longitudinal flanges 48, forming valances, for the attachment of the pedestals 13 and 14. All of the housing sections 27 to 30 have end flanges 49, located in a common vertical plane at the discharge end of the housing, and provide means for the attachment of any of the well known forms of dies, not shown in the drawings.

The housing sections 27 to 30, as shown in Figs. 4, 5, and 6, have internally projecting ribs 50 to 53 which form part of the longitudinal vertical facing surfaces of the housing sections. Said ribs also have curved surfaces which conform to the conical surfaces of the impeller chambers 16 and 17. The two adjacent ribs 50 and 51 on the upper sections of the housing terminate in spaced relation to the two lower adjacent ribs 52 and 53, and form said longitudinal passage 18 connecting the chambers 16 and 17, as shown in Figs. 3 and 4. Said passage 18 forms a space which is occupied by the adjacent portions of the peripheries of the blades of the conical impellers 24 and 25.

The truncated conical impellers 24 and 25 are each constructed with an axial core, or shaft 56, upon which is mounted the helical blades 26. A disk 57 is formed on, or secured upon, the shaft 56 and forms the lower base of the conical impeller.

The impellers 24 and 25 are rotated by means of driven shafts 60 and 61 which are positioned in axial alignment with the shafts 56 of the impellers, as shown in Figs. 1, 3, and 8. The shafts 60 and 61 extend into the housing 19 through apertures formed through the end head 35.

Each of the shafts 60 and 61 is rotatably mounted in a bearing 62 forming part of said head 35. As shown in Fig. 8, each shaft has an enlarged disk 63 which is coupled with the end disk 57 of an impeller by means of a standard coupling plate 65, having keys 66 and 67 loosely mounted in transverse slots formed, in the faces of the disks 56 and 63, to allow for slight variations in alignment between the shafts 60 and 61 and the impellers rotated by said shafts.

A thrust bearing 68 is provided between the disk 63 and the end flange of the bearing 62, as shown in Fig. 8. The shafts 60 and 61 extend through the bearings 62 without the housing and are positioned in acute angular relation to each other, as shown in Fig. 1. Said shafts diverge from the housing for the purpose of obtaining sufficient space between the shafts for mounting large gear wheels upon them, thus permitting the use of high powered driving means for rotating said shafts and the impellers for subjecting the plastic material to greater pressure than has heretofore been possible.

The diverging ends of the shafts 60 and 61 are mounted for rotation in bearings 70 and 71, secured to pedestals 72 and 73, which in turn are mounted upon the base plate 12, as shown in Figs. 1 and 2. The impellers and the shafts 60 and 61 are rotated by means of countershafts 75 and 76, which are mounted in acute angular relation to each other and in parallel relation with the shafts 60 and 61, respectively, as shown in Figs. 1 and 7. The countershafts 75 and 76 are located directly below the shafts 60 and 61, as shown in Figs. 2 and 8. The converging ends of the countershafts are mounted for rotation, as shown in Figs. 7 and 8, in bearings 77 and 78, secured upon pedestals 79 and 80, which are mounted upon the base plate 12. The divergent ends of the shafts 75 and 76 are mounted for rotation in bearings 81 and 82, secured upon the pedestals 72 and 73, as shown in Figs. 2 and 7.

The countershafts 75 and 76 are rotated by means of a chain of speed reduction spur gears driven by a motor 83 mounted upon the bed plate 12.

A pinion 85, on the motor shaft 86, meshes with a larger gear 87, secured upon an idler shaft 88, carrying a small gear 89, which latter meshes with a larger gear 90, secured upon an idler shaft 91, upon which latter is secured a small gear 92, which meshes with a larger gear 93, secured upon the countershaft 76 and rotates the latter.

Upon the countershaft 76 is secured a small gear 94 which meshes with a larger gear 95, secured upon the shaft 61, which in turn rotates the impeller 25. The countershaft 75 is driven by the countershaft 76, by means of bevel gears 96 and 97 secured upon the converging portions of the countershafts.

The countershaft 75 has secured thereon a small gear 98, which meshes with a larger gear 99, secured upon the shaft 60, which in turn rotates the impeller 24, in the opposite direction from the direction of rotation of the impeller 25.

As shown in Fig. 7, the idler shaft 88 is mounted for rotation upon bearings 100 and 101, secured to the bed plate 12. The idler shaft 91 is mounted for rotation upon a bearing 102, secured upon the bed plate 12, and also mounted upon a bearing 103, secured upon the pedestal 73.

The conical formation of the impellers 24 and 25, positioned with their axes converging, and their conical surfaces positioned so that the blades of the two impellers will roll together within the housing, permits the shafts 60 and 61 to diverge from the housing in an acute angle and in axial alignment with the axes of the impellers.

The angular relation of the shafts 60 and 61 permits the use of large gears 95 and 99, each having a greater radius than the distance between said shafts at the points where they enter the bearings 62 of the housing 15. The gears 95 and 99 each have a greater radius than the radius of either of the disks 57 of the impellers. The shafts 60 and 61 may be of large diameter, and extended from the housing, in diverging relation to each other any distance necessary to obtain a clearance for the large gears 95 and 99 adapted for rotating the impellers with the desired amount of power for extruding the material from the housing.

The countershafts 75 and 76 are located below the driven shafts 60 and 61. Said shafts 75 and 76 are positioned in parallel relation with the shafts 60 and 61, as shown in Figs. 1 and 7, which arrangement permits the use of spur gears of heavy construction, arranged in pairs, and mounted upon shafts extending parallel to each other. The countershafts 75 and 76 are rotated in unison by means of the bevel gears 96 and 97.

The operation is as follows: The plastic material is supplied to the machine through the hopper 19 and it is drawn into the chambers of the housing by the continuously rotating impellers, which latter are rotated by the shafts 60 and 61 driven by the countershafts 75 and 76.

The countershaft 76 is driven by the motor 83 through intermediate speed reduction gears 85, 87, 89, 90, 92, and 93, which latter is secured upon the countershaft 76. A gear 94 on the countershaft 76 meshes with the gear 95 on the shaft 61 and rotates the latter and the impeller 25. All of the gears for driving the shaft 61 are arranged with their axes in parallel relation.

The countershaft 76 rotates the countershaft 75 through the bevel gears 96 and 97. The countershaft 75 has secured thereon the gear 98 which meshes with the gear 99 on the shaft 60 and rotates the latter and the impeller 24 in the opposite direction from the impeller 25.

The housing 15 is constructed with the lateral passage 18 connecting the impeller chambers. The impeller blades roll together in tangential relation and have a combined action upon the material and subject the latter to great pressure. The conical chambers of the housing confine the material about the impellers. By constructing the impellers in conical form the helical blades thereof are reduced in surface area, and the blades are positioned closer together toward the vertex of each impeller, whereby increased pressure is applied to the material as it is advanced by the impellers through the housing chambers toward the discharge orifice, through which it is extruded under great pressure.

By constructing the housing in detachable sections, the impellers may be readily removed for cleaning purposes, or for the substitution of impellers having different pitch distances between the blades.

Various changes in the construction and arrangement of the parts may be made without departing from my invention.

I claim:

1. An extruding machine for plastic material having in combination, a housing adapted for receiving said material, said housing having conical chambers formed therein with their axes positioned in acute angular relation to each other and with a longitudinal interconnecting passage throughout the lengths of the chambers at the adjoining sides, conical screw impellers mounted for rotation within the respective chambers and tangent to one another at their adjoining sides, said housing comprising four longitudinal sections detachable along planes perpendicular to each other, one of said planes coinciding with the plane of the plane angle extending through the axes of the two impellers, the other of said planes extending along a line bisecting the angle formed between said axes, means detachably securing said sections together, an end head, and means detachably securing said sections to said head.

2. An extruding machine for plastic material comprising, a housing having conical chambers arranged with their axes converging adjacent to a common vertex, said housing having an inlet opening for receiving said material at the larger ends of said chambers and a discharge opening located adjacent to said vertex, conical screw impellers mounted for rotation within the respective chambers, shafts mounted for rotation in axial alignment with the axes of the respective chambers, said shafts adapted for rotating said impellers, said shafts having portions extending without the housing and diverging in acute angular relation to each other, a countershaft positioned in parallel relation with each of the first mentioned shafts, intermeshing bevel gears secured upon the converging ends of the countershafts adjacent the housing, gearing upon each countershaft and cooperating gearing on the first mentioned shafts, both more remote from the housing than the bevel gears, adapted for rotating the first mentioned shafts respectively, a motor, and speed reduction gearing arranged between the motor and one of said countershafts.

CHARLES E. DELLENBARGER.

REFERENCES CITED

The following references are of record in the file of this patent:

UNITED STATES PATENTS

| Number | Name | Date |
|---|---|---|
| 72,393 | Hale | Dec. 17, 1867 |
| 869,307 | Jones | Oct. 29, 1907 |
| 1,283,947 | Steinle | Nov. 5, 1918 |
| 1,690,784 | Hilgers | Nov. 6, 1928 |
| 1,744,591 | Taurel | Jan. 21, 1930 |
| 2,048,286 | Pease | July 21, 1936 |
| 2,057,467 | Williams | Oct. 13, 1936 |
| 2,360,984 | Schmitz | Oct. 24, 1944 |

FOREIGN PATENTS

| Number | Country | Date |
|---|---|---|
| 180,638 | Great Britain | Oct. 24, 1944 |